US010692087B2

(12) United States Patent
Flanagan et al.

(10) Patent No.: US 10,692,087 B2
(45) Date of Patent: Jun. 23, 2020

(54) ELECTRONIC FINANCIAL SERVICE RISK EVALUATION

(71) Applicant: Blackhawk Network, Inc., Pleasanton, CA (US)

(72) Inventors: Patrick Ryan Flanagan, Pleasanton, CA (US); Rajesh Ponnam, San Ramon, CA (US)

(73) Assignee: BLACKHAWK NETWORK, INC., Pleasanton, CA (US)

( * ) Notice: Subject to any disclaimer, the term of this patent is extended or adjusted under 35 U.S.C. 154(b) by 132 days.

(21) Appl. No.: 14/244,619

(22) Filed: Apr. 3, 2014

(65) Prior Publication Data

US 2014/0304148 A1 Oct. 9, 2014

Related U.S. Application Data

(60) Provisional application No. 61/808,025, filed on Apr. 3, 2013.

(51) Int. Cl.
*G06Q 20/04* (2012.01)
*G06Q 20/40* (2012.01)
*G06Q 20/34* (2012.01)

(52) U.S. Cl.
CPC ......... *G06Q 20/4016* (2013.01); *G06Q 20/04* (2013.01); *G06Q 20/342* (2013.01)

(58) Field of Classification Search
None
See application file for complete search history.

(56) References Cited

U.S. PATENT DOCUMENTS

| | | | | |
|---|---|---|---|---|
| 5,708,422 A | * | 1/1998 | Blonder | G06Q 20/40 340/5.41 |
| 6,006,258 A | * | 12/1999 | Kalajan | H04L 29/06 709/219 |
| 6,029,150 A | * | 2/2000 | Kravitz | G06Q 20/02 705/39 |
| 6,119,093 A | * | 9/2000 | Walker | G06Q 20/10 705/35 |
| 7,398,925 B2 | * | 7/2008 | Tidwell | G06Q 20/042 235/440 |
| 7,588,181 B2 | * | 9/2009 | Shipman | G06Q 20/102 235/379 |

(Continued)

OTHER PUBLICATIONS

Filing receipt and specification for provisional patent application entitled "eGift Risk-Decision System and Method," by Patrick Ryan Flanagan, filed Apr. 3, 2013 as U.S. Appl. No. 61/808,025.

*Primary Examiner* — William J Jacob
(74) *Attorney, Agent, or Firm* — Wick Phillips Gould & Martin LLP; Jerry C. Harris, Jr.

(57) ABSTRACT

Electronic stored value cards ("eSVCs") may be susceptible to fraud, theft, or unauthorized access. As eSVCs are still relatively new, the eSVC industry may not have fully developed sufficient safeguards to prevent such fraud, therft, and unauthorized access. Disclosed herein are systems, apparatus, and methods for evaluating whether or not to provide a service, which may include displaying, funding, or authorizing an eSVC. The evaluation may be in response to a request for such a service. The evaluation may be based on a risk due to fraud, theft, or unauthorized access.

16 Claims, 8 Drawing Sheets

(56) References Cited

U.S. PATENT DOCUMENTS

| | | | | |
|---|---|---|---|---|
| 7,610,040 B2* | 10/2009 | Cantini | ............... | G06Q 20/04 340/5.9 |
| 8,806,591 B2* | 8/2014 | Dallas | ............... | G06F 21/46 726/22 |
| 2001/0029496 A1* | 10/2001 | Otto | ............... | G06Q 20/04 705/74 |
| 2002/0145050 A1* | 10/2002 | Jayaratne | ............... | G06Q 20/341 235/492 |
| 2002/0194119 A1* | 12/2002 | Wright | ............... | G06Q 20/04 705/38 |
| 2003/0076819 A1* | 4/2003 | Emerson, III | ............... | H04L 29/06027 370/352 |
| 2003/0140007 A1* | 7/2003 | Kramer | ............... | G06Q 20/04 705/40 |
| 2003/0145205 A1* | 7/2003 | Sarcanin | ............... | G06Q 20/02 713/172 |
| 2005/0068169 A1* | 3/2005 | Copley | ............... | G08B 21/0283 340/539.13 |
| 2005/0097049 A1* | 5/2005 | Writer | ............... | G06Q 20/00 705/44 |
| 2005/0216587 A1* | 9/2005 | John | ............... | H04L 63/101 709/225 |
| 2005/0228773 A1* | 10/2005 | Malik | ............... | G06F 17/30864 |
| 2005/0278542 A1* | 12/2005 | Pierson | ............... | H04L 63/0876 713/182 |
| 2006/0026097 A1* | 2/2006 | Nethery, III | ............... | G06Q 20/102 705/40 |
| 2013/0036048 A1* | 2/2013 | Campos | ............... | G06Q 20/36 705/41 |
| 2013/0339186 A1* | 12/2013 | French | ............... | G06F 21/577 705/26.35 |
| 2014/0122331 A1* | 5/2014 | Vaish | ............... | G06O 20/3674 705/41 |
| 2014/0150097 A1* | 5/2014 | Carvalho | ............... | H04L 63/14 726/22 |

\* cited by examiner

ELECTRONIC FINANCIAL SERVICE RISK EVALUATION

CROSS-REFERENCE TO RELATED APPLICATION

This application claims priority to U.S. provisional patent application No. 61/808,025 filed Apr. 3, 2013 by Patrick Ryan Flanagan and titled "eGift Risk-Decision System and Method," which is incorporated by reference.

BACKGROUND

The disclosure generally relates to evaluating risk for electronic financial services and specifically relates to the mitigation of fraud and theft related to electronic stored-value cards (eSVCs).

The monetary transaction market is currently filled with many types of stored-valued cards (SVCs), pre-paid cards, debit cards, credit cards, and loyalty cards, all of which may be offered by different issuers, vendors, and providers. Some of the cards are tailored to be redeemed from a retailer while others may be redeemed by financial institutions. Other cards, such as loyalty cards, may have promotions associated with them.

For pre-paid cards and debits cards, money may be on deposit with the issuer of those cards, and those cards may be issued in the name of individual account holders. For SVCs, however, money may be stored on the cards themselves in the form of coded data. The money or value of SVCs may be accessed using a magnetic strip embedded in the card, using radio-frequency identification (RFID), or by entering a number printed on the card. SVCs may be anonymous and therefore may not be issued in the name of individual account holders.

eSVCs, which may include electronic gift cards, or eGift cards, as well as other forms of electronic transaction media, are becoming increasingly popular. Instead of providing a physical card to swipe at a retailer's location, eSVCs may appear electronically on, for instance, an application on a user's mobile device. The user may enter a retail location, open an application on his mobile phone, display an eSVC using the application, hold near to a scanner the portion of his mobile phone displaying the eSVC, and perform an electronic transaction for a good or service. The amount of money associated with the good or service may then be deducted from the total amount of money on the eSVC.

SUMMARY

In one embodiment, the disclosure includes an apparatus comprising: a receiver configured to receive a request for a service; a processor coupled to the receiver and configured to: obtain data associated with the request, process the data, determine parameters based on the data, and perform a risk evaluation based on the parameters; and a transmitter coupled to the processor and configured to transmit a response to the request, wherein the response is based on the risk evaluation. Apparatus, as used herein, means interchangeably, apparatus, device, system or article.

In another embodiment, the disclosure includes an apparatus comprising: first modules configured to determine parameters based on a request; a second module coupled to the first module and configured to: receive the parameters from the first modules, calculate a risk score based on those parameters; and determine whether or not to provide an electronic stored-value card (eSVC) service based on the risk score.

In yet another embodiment, the disclosure includes an apparatus comprising: a processor configured to create a request for an electronic financial service; a transmitter coupled to the processor and configured to: receive the request from the processor, and transmit the request; and a receiver coupled to the processor and configured to receive a response to the request, wherein the response is based on a risk associated with the apparatus.

In yet another embodiment, the disclosure includes a method comprising: receiving a request for an electronic financial service; obtaining data associated with the request; determining parameters based on the data; calculating a risk score based on the parameters; and sending a response to the request based on the risk score.

In yet another embodiment, the disclosure includes a system comprising: at least one first module configured to determine parameters based on a request; a second module coupled to the at least one first module and configured to: receive the parameters from at least one first module, calculate a risk score based on those parameters; and determine whether or not to provide an electronic financial service based on the risk score.

DETAILED DESCRIPTION eSVCs may be susceptible to fraud, theft, or unauthorized access. As eSVCs are still relatively new, the eSVC industry may not have fully developed sufficient safeguards to prevent such fraud, theft, and unauthorized access. Accordingly, there is a need to develop such safeguards. Those safeguards may be developed at various points in eSVC transactions, for instance when a user attempts to display, fund, or authorize the eSVC.

Disclosed herein are embodiments for evaluating whether or not to provide a service, which may include displaying, funding, or authorizing an eSVC. The evaluation may be in response to a request for such a service. The evaluation may be based on a risk due to fraud, theft, or unauthorized access. The eSVC may be displayed, funded, or authorized by an eSVC provider, an electronic wallet (e-wallet) provider, an eSVC processor, an eSVC issuer, a merchant, or another suitable entity. While the disclosure may discuss eSVCs, the disclosure may also apply to other electronic or transaction media. In addition, while the disclosure may discuss displaying, funding, or authorizing an eSVC, the disclosure may also apply to other processes or points in an eSVC transaction.

Figure 1:
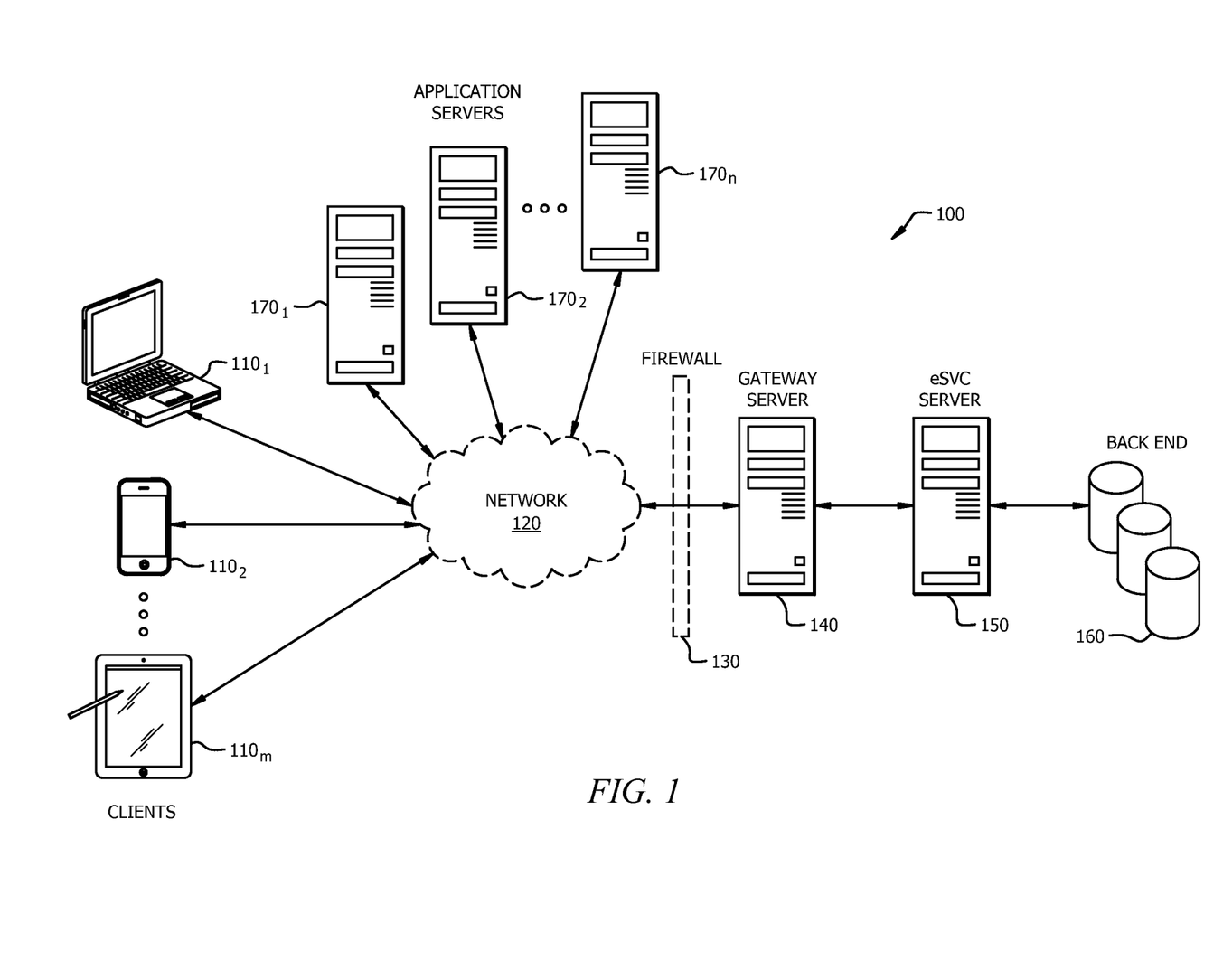
FIG. 1 is a schematic diagram of a network according to an embodiment of the disclosure.

FIG. 1 is a schematic diagram of a network 100 according to an embodiment of the disclosure. The network 100 may comprise clients $110_{1-m}$ and application servers $170_{1-n}$ communicatively coupled to a gateway server 140 via a network 120 and through a firewall 130. The gateway server 140 may be communicatively coupled to an eSVC server 150, which may, in turn, be communicatively coupled to a back end 160. The components of the network 100 may be arranged and coupled as shown or in another suitable manner.

The clients $110_{1-m}$ may be notebook computers, tablet computers, desktop computers, mobile telephones, or other devices suitable for sending communication to, and receiving communication from, the network 120. M may be any positive integer. The clients $110_{1-m}$ may be associated with users, who may operate the clients $110_{1-m}$ using a graphical user interface (GUI). In addition, the clients $110_{1-m}$ may comprise an application, which may be any software application coded in any format for purposes of carrying out designated tasks based on automation or user input. The users may use the application using the GUI. The application may be, for example, an Internet browser.

The network 120 may be any network suitable for allowing communication among the clients $110_{1-m}$, the gateway server 140, and the application servers $170_{1-n}$. For example, the network 120 may be the Internet or a mobile telephone network. The network 120 may allow communication along wired or wireless channels.

The firewall 130 may be a software-based or hardware-based system suitable for controlling communication to and from the gateway server 140. The firewall 130 may control communication by applying rules to communications. The rules may be set by an administrator via the gateway server 140, the eSVC server 150, or another suitable device. The firewall 130 may include the gateway server 140.

The gateway server 140 may be a hardware server or other device suitable for serving as an interface between the clients $110_{1-m}$ and the application servers $170_{1-n}$ on the one hand and the eSVC server 150 on the other hand. The gateway server 140 may translate and convert network protocols in order to allow such communication. The gateway server 140 may require bi-directional Hypertext Transfer Protocol Secure (HTTPS) or other protocol authentication using mutual certificate-based Secure Sockets Layer (SSL), Transport Layer Security (TLS), or another suitable form of authentication. HTTPS, SSL, and TLS are incorporated by reference.

The eSVC server 150 may be a hardware server or other device suitable for storing data and providing that data to requesting clients, for instance the clients $110_{1-m}$. The eSVC server 150 may be dedicated to providing data associated with a single service or with multiple services. When another device, for instance one of the clients $110_{1-m}$, requests a service from the eSVC server 150, the eSVC server 150 may retrieve from the back end 160 a resource associated with the service.

The back end 160 may be a device or devices suitable for storing the resources associated with the service. The back end 160 may reside within or without the eSVC server 150. The back end 160 may not run independently, but may instead require commands from the eSVC server 150. For example, the back end 160 may be a database operated using Structured Query Language (SQL), which is incorporated by reference, or another suitable language or protocol.

The firewall 130, the gateway server 140, the eSVC server 150, and the back end 160, or any combination of those components, may be located in the network 120 or a portion of the network 120. Specifically, those components may be located in a cloud and operate, from the perspective of an entity associated with the eSVC server 150, in a cloud computing environment. In other words, those components may not be physically located where the entity associated with the eSVC server 150 resides. The cloud may be, for instance, an Amazon® cloud.

The application servers $170_{1-n}$ may be hardware servers or other devices suitable for sending communication to, and receiving communication from, the network 120. N may be any positive integer. The application servers $170_{1-n}$ may be associated with partners, which may be brick-and-mortar merchants such as Safeway® or Albertsons®; gift, credit, and other card issuers such as Starbucks® or Visa®; or other entities. Each partner may have multiple application servers $170_{1-n}$ associated with it.

Figure 2:
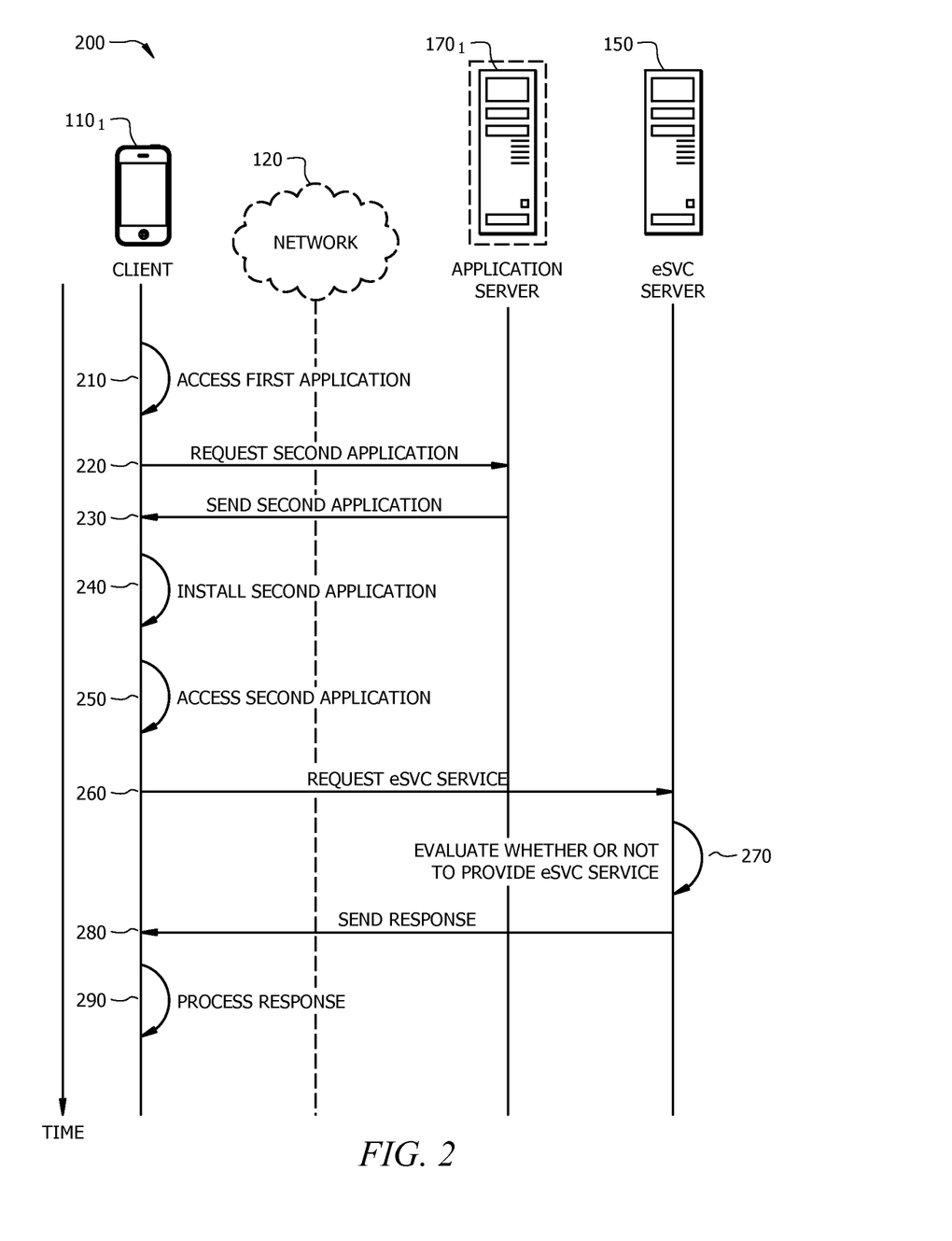
FIG. 2 is a simplified message sequence diagram illustrating service provision according to an embodiment of the disclosure.

FIG. 2 is a simplified message sequence diagram 200 illustrating service provision according to an embodiment of the disclosure. The diagram 200 is simplified, so it is understood that additional steps may be necessary to perform the steps shown. At step 210, a user may access a first application on the client $110_1$. The client $110_1$ may be an iPhone®, and the application may be the App Store®, which may come pre-installed on the client $110_1$.

The user may desire to download from the App Store® a second application associated with a partner, for instance Starbucks®. Through commands, the user may instruct the first application to attempt to download the second application from an application server associated with the partner, for instance the application server $170_1$. At step 220, the client $110_1$ may send to the application server $170_1$ a request for the second application. At step 230, the application server $170_1$ may send to the client $110_1$ the second application. At step 240, the client $110_1$ may install the second application. At step 250, the user may access the second application.

While accessing the second application, the user may desire to access an eSVC associated with the second application. A server, for instance the eSVC server 150, may provide services associated with the eSVC. Through commands, the user may instruct the second application to access a service associated with the eSVC. The service may be to display, fund, or authorize the eSVC. At step 260, the client $110_1$ may send to the eSVC server 150 a request for the service. Alternatively, the client $110_1$ may route the request through the application server $170_1$ or another server or proxy, which may or may not be associated with the partner. The request may be in the form of a Hypertext Transfer Protocol (HTTP) message. At step 270, the eSVC server 150 may evaluate whether or not to provide the service. In performing the evaluation, the eSVC server 150 may evaluate the user, the client $110_1$, the application server $170_1$, or other entities or data. At step 280, the eSVC server 150 may send to the client $110_1$ a response providing the service, indicating that the eSVC server 150 will not provide the service, or indicating other information. Alternatively, the eSVC server 150 may route the response through the application server $170_1$ or another server or proxy, which may or may not be associated with the partner. At step 290, the client $110_1$ may process the response. Based on the response, the client $110_1$ may or may not be able to use the service. For example, if the eSVC server 150 responded with the service, then the client 110₁ may display the eSVC on its screen.

Figure 3:
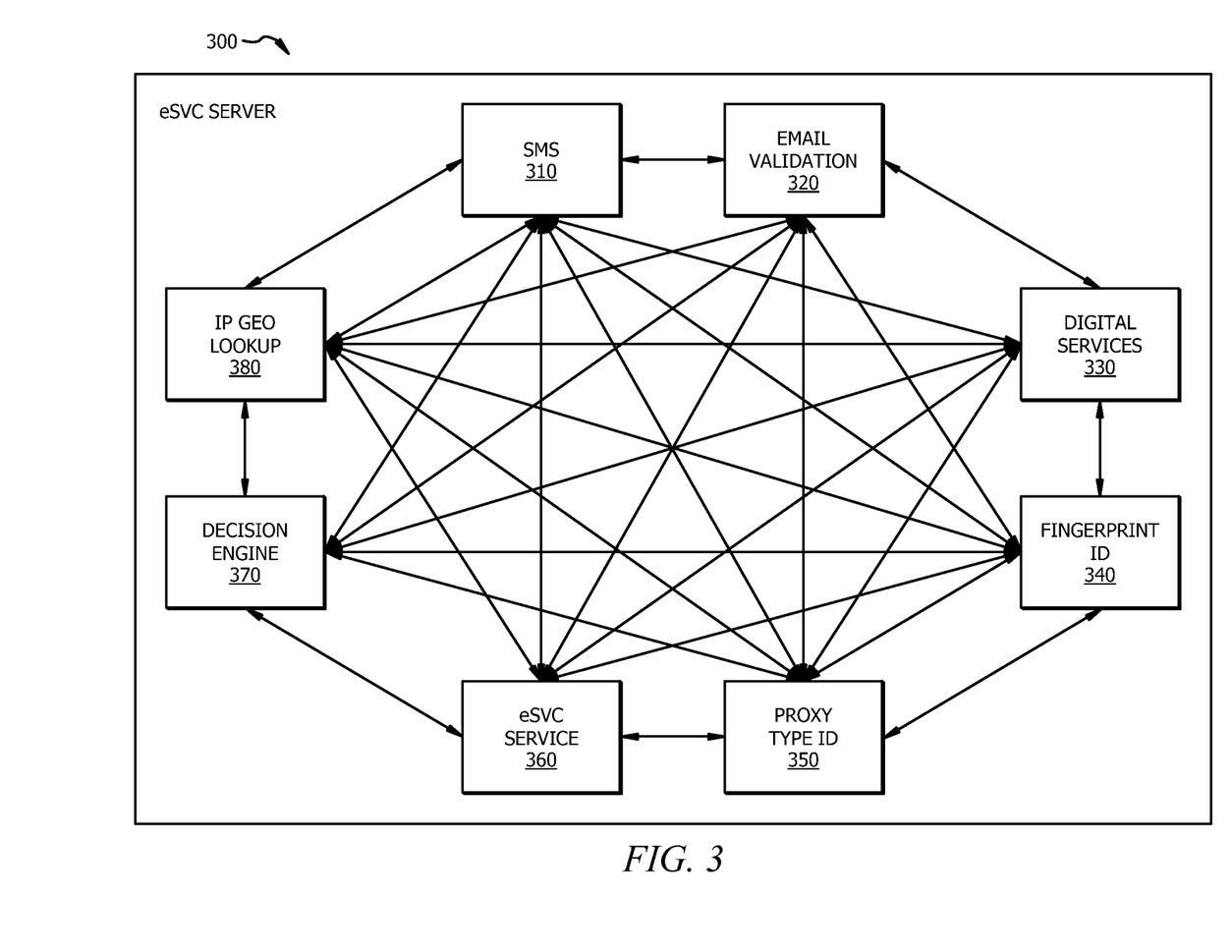
FIG. 3 is a schematic diagram of a risk evaluator according to an embodiment of the disclosure.

FIG. 3 is a schematic diagram of a risk evaluator 300 according to an embodiment of the disclosure. The risk evaluator 300 may be the eSVC server 150 in FIG. 1, or the eSVC server 150 may comprise the risk evaluator 300. The risk evaluator 300 may comprise various modules, including a Short Message Service (SMS) module 310, an email validation module 320, a digital services module 330, a fingerprint identification (ID) module 340, a proxy type ID module 350, an eSVC service module 360, a decision engine module 370, and an Internet Protocol (IP) geographical (Geo) module 380. The modules may be suitable for receiving a request to provide an eSVC service, evaluating whether or not to provide that service, and sending a response to the request as shown in steps 260-280 in FIG. 2. Returning to FIG. 3, the response may provide the service, indicate that the risk evaluator 300 will not provide the service, or indicate other information. The modules may be arranged and coupled as shown or in another suitable manner. Each module may be communicatively coupled to the other modules as shown or in another suitable manner. The modules may be combined or separated into different modules or in any manner suitable for performing the described functions. Furthermore, the modules or the functions they perform may be located in the risk evaluator 300 as shown or in any suitable combination of devices. For example, some modules or module functions may be in the risk evaluator 300 while other modules or module functions may be in a different device. The modules and their functions are described more fully below with respect to FIG. 4.

Figure 4:
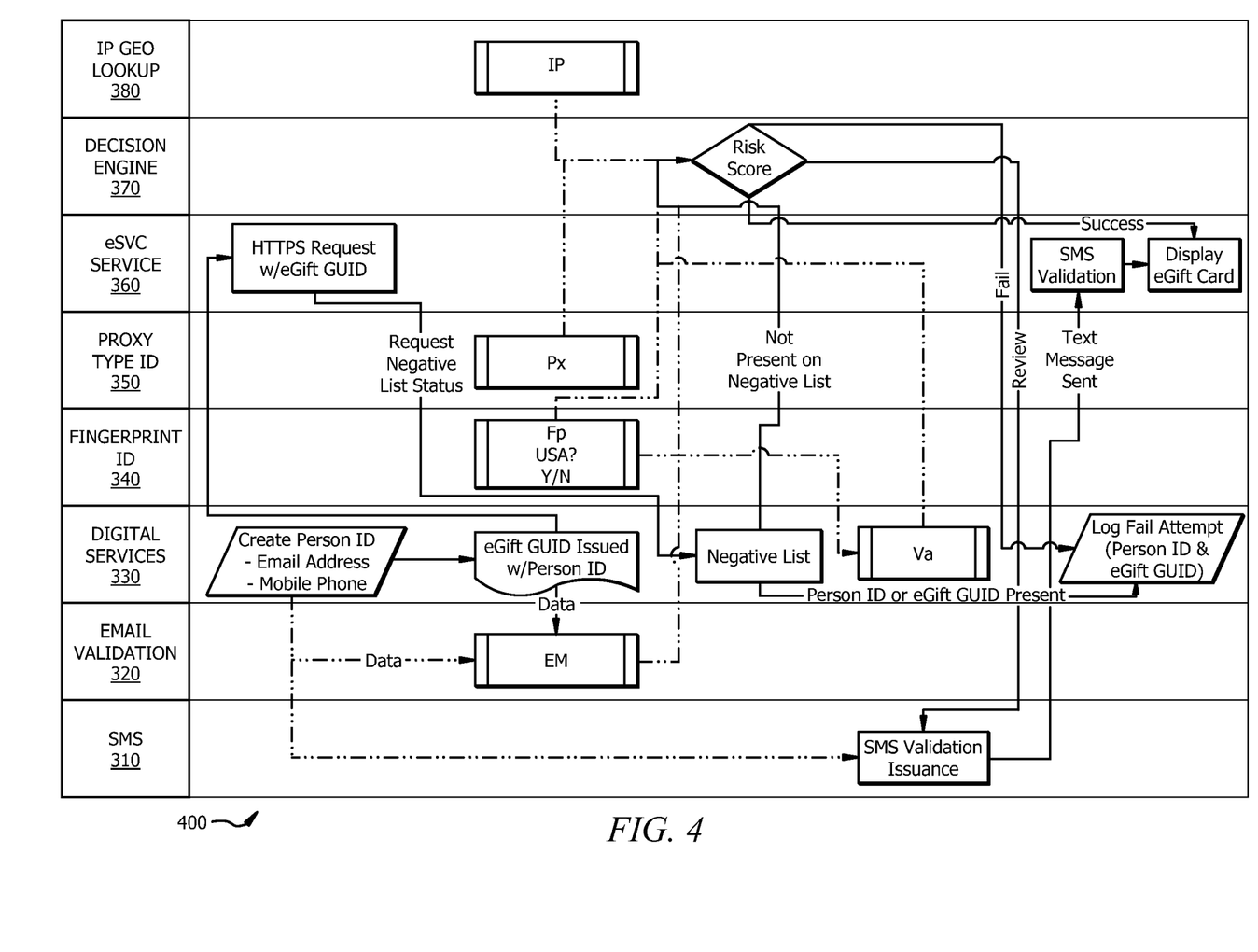
FIG. 4 is a data flow and process flow diagram of service provision determination according to an embodiment of the disclosure.

FIG. 4 is a data flow and process flow diagram 400 of service provision determination according to an embodiment of the disclosure. The diagram 400 may comprise the SMS module 310, the email validation module 320, the digital services module 330, the fingerprint ID module 340, the proxy type ID module 350, the eSVC service module 360, the decision engine module 370, and the IP Geo module 380. The lined rows may indicate processes performed by their respective modules, the dashed lines may indicate data flow, and the solid lines may indicate process flow. The data flows and the process flows are described more fully below with respect to the modules associated with those data flows and process flows.

The SMS module 310 may be any module suitable for receiving, generating, and sending data associated with SMS validation issuance. The SMS module 310 may generate the SMS validation issuance based on data received from the digital services module 330 and an instruction received from the decision engine module 370. The data received from the digital services module 330 may be a person ID, and the instruction received from the decision engine module 370 may be an instruction to validate a requesting device. The SMS module 310 may send the SMS validation issuance to the eSVC service module 360.

For example, the SMS module 310 may have received from the digital services module 330 a phone number associated with the requesting device. The SMS module 310 may then send a text to the phone number and await a response text from that phone number. If the SMS module 310 receives the response text, then the SMS module 310 may generate the SMS validation issuance. If the SMS module 310 does not receive the response text, for instance after a specified period of time, then the SMS module 310 may not generate the SMS validation issuance, but may instead inform a module, for instance the digital services module 330, of the result.

The email validation module 320 may be any module suitable for receiving, generating, and sending data associated with an EM parameter. The email validation module 320 may generate the EM parameter based on data received from the digital services module 330. The data received from the digital services module 330 may be the person ID, a globally unique identifier (GUID), or both the person ID and the GUID. The email validation module 320 may send the EM parameter to the decision engine module 370.

The EM parameter may be a generic data point "email type" that indicates whether or not an email address is trusted, whether or not the email address is from a free email provider, whether or not the email address is high risk, or other suitable information regarding the email address. The EM parameter may be at least one of three values. A first value, 1, may indicate that the email address is trusted. A second value, 0.6, may indicate that the email address is from a free email provider. A third value, 0.2, may indicate that the email address is high risk. The EM parameter may be any other suitable value to indicate any other suitable information regarding the person ID or the GUID.

The digital services module 330 may be any module suitable for receiving, generating, and sending data associated with the person ID, the GUID, a negative list, a Va parameter, and a fail attempt log. The digital services module 330 may generate the person ID based on data received from another module or device, for instance one of the clients 110₁₋ₘ or one of the application servers 170₁₋ₙ. The data received from the other module or device may be an email address, a mobile phone number, both an email address and a mobile phone number, or other suitable data, and the person ID may be the same data, though the data may be reformatted. The digital services module 330 may send the person ID to the SMS module 310 and the email validation module 320, and the digital services module 330 may instruct itself to generate the GUID based on the person ID.

The digital services module 330 may generate the GUID based on data received from itself. The data received from itself may be the person ID. The GUID may be referred to as an electronic gift (eGift) GUID. The digital services module 330 may send the GUID to the email validation module 320, and the digital services module 330 may instruct the eSVC service module 360 to generate an HTTPS request based on the GUID.

The digital services module 330 may generate the negative list in any suitable manner. The negative list may reflect person IDs and GUIDs for other devices that are not to receive eSVC services. The eSVC service module 360 may request a negative list status of a particular person ID or GUID. If the person ID or GUID is not on the negative list, then the digital services module 330 may inform the decision engine module 370 of the result, and the decision engine module 370 may further process the request. If the person ID or GUID is on the negative list, then the digital services module 330 may instruct itself to log the fail attempt.

The digital services module 330 may generate the Va parameter based on data received from the fingerprint ID module 340. The data received from the fingerprint ID module 340 may be an Fp parameter. The digital services module 330 may send the Va parameter to the decision engine module 370.

The Va parameter may be a data attribute "view attempt" that indicates the number of times the GUID has been used to request, using HTTPS or another suitable communication form, a service from the risk evaluator 300 or a device associated with the risk evaluator 300, which may be one of the application servers $170_{1-n}$. The Va parameter may indicate the number of times the GUID has been successfully used for such purposes. The Va parameter may be an integer and may be associated with the Fp parameter. Each time the GUID makes a request, the digital services module 330 may store the request, associate the request with the Fp parameter in order to associate the request with the requesting device, and increase the value of the Va parameter by one. If the Va parameter would otherwise be 0, then the digital services module 330 may initialize the Va parameter at 1.

The digital services module 330 may generate the fail attempt log based on an instruction from itself and the decision engine module 370. The instruction received from itself may be the instruction to log the fail attempt described above, and the instruction received from the decision engine module 370 may be based on a risk score. The digital services module 330 may maintain the fail attempt log internally and may or may not send the fail attempt log to itself, another module, or another device.

The fingerprint ID module 340 may be any module suitable for receiving, generating, and sending data associated with the Fp parameter. The fingerprint ID module 340 may generate the Fp parameter in any suitable manner. The fingerprint ID module 340 may send the Fp parameter to the digital services module 330 and the decision engine module 370.

The Fp parameter may be a unique ID commonly referred to as a "device fingerprint" that uniquely identifies a device requesting a service from the risk evaluator 300 or a device associated with the risk evaluator 300. The Fp parameter may be determined based on a proprietary or other method. The Fp parameter may be at least one of three values. A first value, 0.001, may indicate that the requesting device is blacklisted or not allowed to further communicate with, or receive services from, the risk evaluator 300. A second value, 1, may indicate that the requesting device previously received a successful service from the risk evaluator 300 or a device associated with the risk evaluator 300. A third value, 0.5, may indicate that the requesting device is a new device that is unknown to the risk evaluator 300. The Fp parameter may be any other suitable value to indicate any other suitable information regarding the requesting device.

The proxy type ID module 350 may be any module suitable for receiving, generating, and sending data associated with a Px parameter. The proxy type ID module 350 may generate the Px parameter based on data received from a proxy associated with a device requesting a service from the risk evaluator 300 or a device associated with the risk evaluator 300. The proxy may be one of the application servers $170_{1-n}$. The data received from the proxy may be an IP address of the proxy. The proxy type ID module 350 may send the Px parameter to the decision engine module 370.

The Px parameter may be a generic data point "proxy type" that indicates a proxy server used to initiate a final HTTP request to a webserver or other suitable information. The webserver may be the eSVC server 150. The Px parameter may be at least one of two values. A first value, 0.5, may indicate that the proxy is anonymous. A second value, 0.9, may indicate that the proxy is associated with a valid business. The business may be known to the risk evaluator 300. The Px parameter may be any other suitable value to indicate any other suitable information regarding the proxy.

The eSVC service module 360 may be any module suitable for receiving, generating, and sending data associated with an HTTPS request, an SMS validation, and displaying the eSVC. The eSVC service module 360 may generate the HTTPS request based on an instruction received from the digital services module 330. The instruction may include the GUID. The eSVC service module 360 may request negative list status of the GUID from the digital services module 330.

The eSVC service module 360 may generate the SMS validation based on an instruction received from the SMS module 310. The instructions received from the SMS module 310 may be to recognize the SMS validation issuance. The eSVC service module 360 may send the SMS validation to itself in order to display the eSVC.

The eSVC service module 360 may display the eSVC based on the instruction received from itself and described above and based on an instruction received from the decision engine module 370. The instruction received from the decision engine module 370 may indicate that the risk score is acceptable and that the eSVC service module 370 should display the eSVC. The eSVC service module 360 may then send to the requesting device data necessary to display the eSVC. The data may be similar to the response sent at step 280 in FIG. 2.

The decision engine module 370 may be any module suitable for receiving, generating, and sending data associated with the risk score. The decision engine module 370 may generate the risk score based on data received from the email validation module 320, the digital services module 330, the fingerprint ID module 340, the proxy type ID module 350, and IP Geo module 380 and based on an instruction from the digital services module 330. The data received from the email validation module 320 may be the EM parameter, the data received from the digital services module 330 may be the Va parameter, the data received from the fingerprint ID module 340 may be the Fp parameter, the data received from the proxy type ID module 350 may be the Px parameter, and the data received from the IP Geo module 380 may be an IP parameter. The instruction received from the digital services module 330 may be that the person ID or GUID is not on the negative list. If the risk score indicates a success, then the decision engine module 370 may instruct the eSVC service module 360 of the success. If the risk score indicates a failure, then the decision engine module 370 may instruct the digital services module 330 of the failure. If the risk score indicates that further validation is needed, then the decision engine module 370 may instruct the SMS module 310 to review the request.

The IP Geo lookup module 380 may be any module suitable for receiving, generating, and sending data associated with the IP parameter. The IP Geo lookup module 380 may generate the IP parameter based on data received from the requesting device or a proxy associated with the requesting device. The data received from the requesting device or the proxy associated with the requesting device may be an IP address of the requesting device or the proxy associated with the requesting device. The IP Geo lookup module 380 may send the IP parameter to the decision engine module 370.

The IP parameter may be a unique ID using the IP address of the requesting device or the proxy associated with the requesting device. The IP address may indicate the country or region that the requesting device or proxy is located in.

Some countries and regions may not be approved for accessing the eSVC. Accordingly, the IP parameter may indicate whether or not the requesting device or proxy is in an approved country or region. The IP parameter may be one of at least two values. A first value, 1, may indicate that the requesting device or proxy is in an approved country or region. A second value, 0.1, may indicate that the requesting device or proxy is not in an approved country or region.

The risk score may be calculated based on the following equation:

$$\text{risk score} = E \times P x \times Va(Fp) \times Fp \times Ip \quad (1)$$

wherein, for example, EM=a generic data point "Email Type" refers to wither an email address has been found to be valid, if the address leverages a free email provider, and if the address has been found to be from an untrusted provider or specific user; Px=a generic data point "Proxy Type" a reference to the proxy server leveraged to initiate the final http request to the webserver, and if that proxy has been identified as an anonymous, validated or business; Va=a specific data attribute "View Attempt" equals the number of times a specific eGift (GUID) has been used successfully; Fp=a unique ID commonly referred to as a "Device Fingerprint" is a proprietary method of identifying a device; and Ip=a unique user ID leveraging the Internet Protocol Address to understand the originating location of a device based in the approved region for redemption of that specific gift card.

The Va parameter may be represented as Va(Fp) because the Va parameter may be a function of the Fp parameter. Each of the parameters may have a default value of 1. The risk score may be segregated into at least one of three value ranges. A first value range, anything greater than or equal to 0.6, may indicate that the risk evaluator 300 may approve the requesting device's service request. Accordingly, the decision engine module 370 may direct the eSVC service module 360 to provide the service to the requesting device. The eSVC service module 360 may then provide the service. A second value range, anything greater than 0.3 but less than 0.6, may indicate that the risk evaluator 300 may or may not approve the requesting device's service request and that SMS or other validation is required. If the SMS module 310 confirms SMS validation, then the eSVC service module 360 may provide the service. If the SMS module 310 does not confirm SMS validation, then the eSVC service module 360 may not provide the service. Accordingly, the digital services module 330 may direct itself to log the fail attempt. A third value range, anything less than or equal to 0.3, may indicate that the risk evaluator 300 may not approve the requesting device's service request. Accordingly, the digital services module 330 may direct itself to log the fail attempt.

Figure 5:
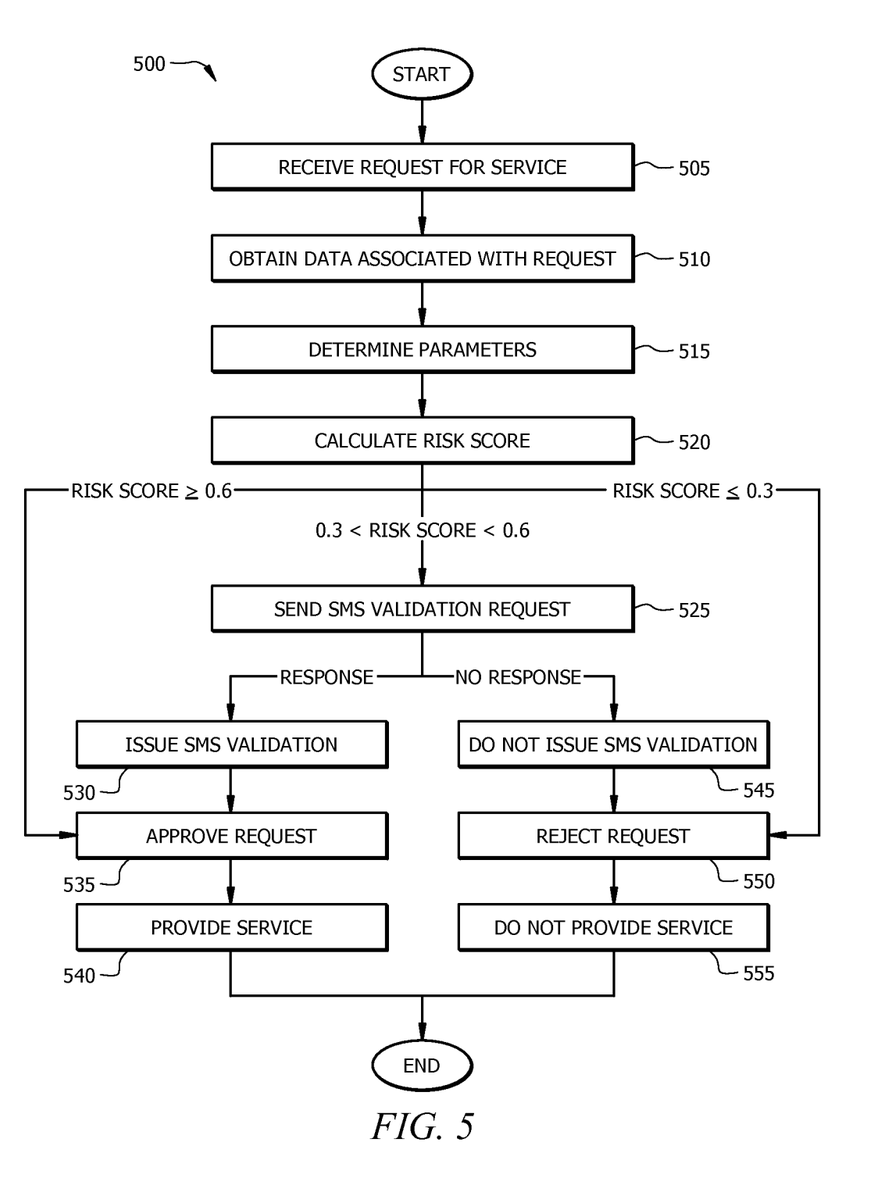
FIG. 5 is a flowchart illustrating a simplified method of service provision determination according to an embodiment of the disclosure.

FIG. 5 is a flowchart illustrating a simplified method 500 of service provision determination according to an embodiment of the disclosure. The method 500 may demonstrate a simplification of the diagram 400 in FIG. 4, so it is understood that additional steps, for instance the steps in FIG. 4, may be necessary to perform the steps shown. Returning to FIG. 5, the risk evaluator 300 may perform the method 500.

At step 505, a request for a service may be received. The request may be received from a requesting device, which may be one of the clients $110_{1-m}$, or the request may be received from a proxy associated with one of the clients $110_{1-m}$. The service may be to view, fund, or authorize an eSVC. At step 510, data associated with the request may be obtained. The data may include an email address, a mobile phone number, both an email address and a mobile phone number, or other suitable data associated with the requesting device or proxy. The data may be included in the request or may be obtained by other means. At step 515, parameters may be determined. The parameters may be the EM parameter, the Va parameter, the Fp parameter, the Px parameter, and the IP parameter. At step 520, a risk score may be calculated. The risk score may be calculated using equation 1.

Depending on the risk score, the method 500 may proceed to one of three paths. If the risk score is greater than or equal to 0.6, then the method may proceed from step 520 to step 535 where the request for the service may be approved. At step 540, the service may be provided. If the risk score is greater than 0.3 but less than 0.6, then the method may proceed to step 525. At step 525, an SMS validation request may be sent. The SMS validation request may be sent to the requesting device or proxy in the form of a text message. If a response to the SMS validation request is received, then the method may proceed to step 530. At step 530, an SMS validation may be issued and the method may proceed to steps 535 and 540. If a response to the SMS validation request is not received, then the method may proceed to step 545. At step 545, an SMS validation may not be issued, at step 550, the request for the service may be rejected, and, at step 555, the service may not be provided. If the risk score is less than or equal to 0.3, then the method 500 may proceed from step 520 to step 550 where the request for the service may be rejected, then to step 555 where the service may not be provided.

As an example, the client $110_1$ may request, via a proxy, viewing of an eSVC. At step 505, the risk evaluator 300 may receive the request. At step 510, the risk evaluator 300 may obtain data from the request. The data may be an email address associated with the client $110_1$ or a user of the client $110_1$, a phone number associated with the client $110_1$, an IP address of the client $110_1$, and proxy data sufficient to determine whether the proxy is associated with a business or is anonymous. At step 515, the risk evaluator may determine the EM parameter, the Px parameter, the Va parameter, the Fp parameter, and the IP parameter. The EM parameter may be 0.6 because the email address is from a free email provider. For instance, the email address may be john.doe@hotmail.com. The Px parameter may be 0.9 because the proxy server used to initiate the final HTTP request to the webserver is associated with a business. The Va parameter may be 2 because the GUID was twice used to request a service from the risk evaluator 300. The Fp parameter may be 0.5 because the requesting device is a new device that is unknown to the risk evaluator 300. The IP parameter may be 1 because the requesting device or proxy is in an approved country or region. For instance, the requesting device or proxy may be located in the United States. At step 520, the risk evaluator 300 may use those parameter values and calculate a risk score of 0.6×0.9×2×0.5×1=0.54 using equation 1. With a score of 0.54, the decision engine module 370 may require SMS validation. Accordingly, at step 525, the risk evaluator 300 may send an SMS validation request to the requesting device or proxy. The risk evaluator 300 may receive a response from the requesting device, so, at step 530, the risk evaluator 300 may issue an SMS validation. At step 535, the risk evaluator 300 may approve the request. Finally, at step 540, the risk evaluation 300 may provide the service.

Figure 6:
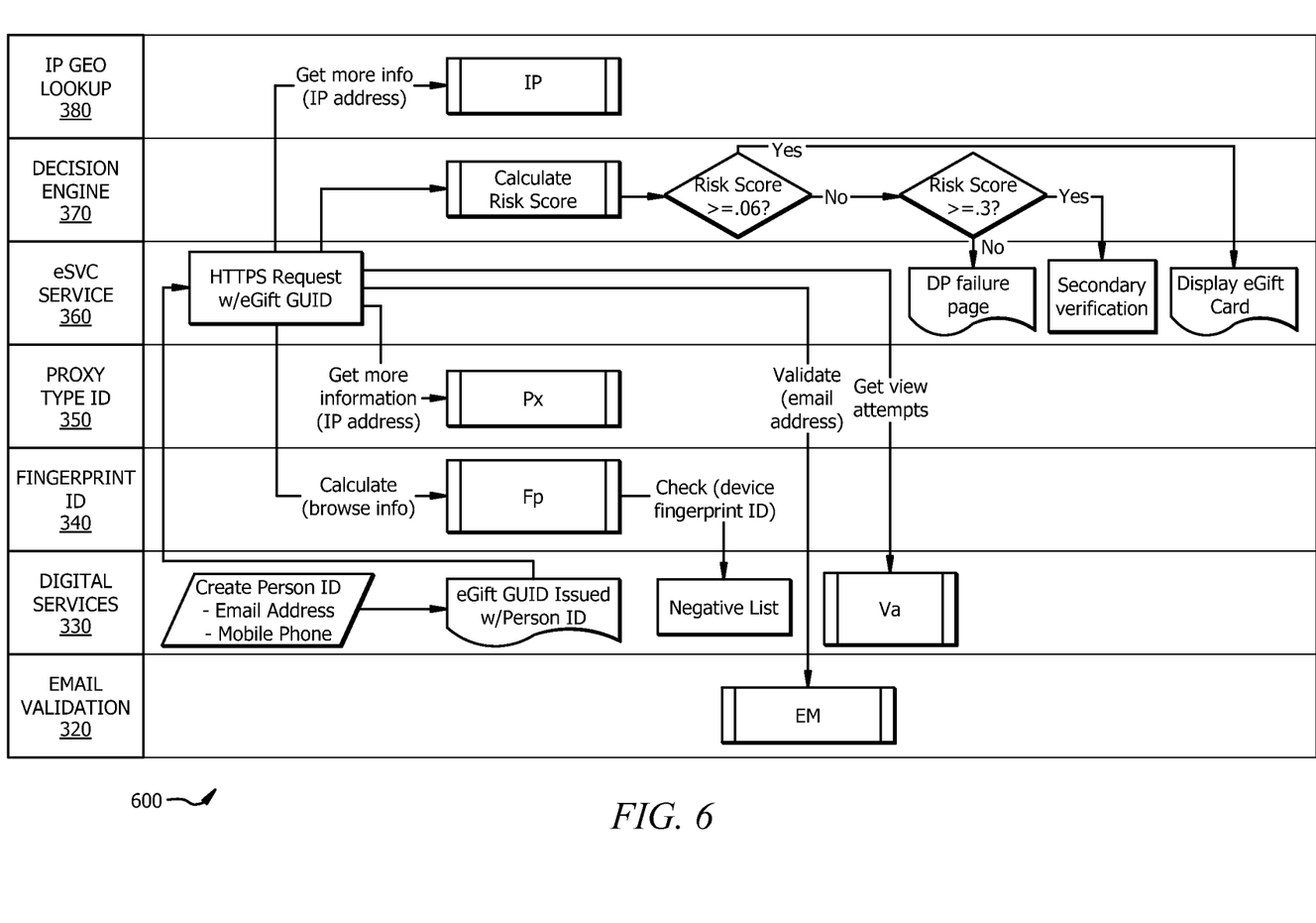
FIG. 6 is a process flow diagram of service provision determination according to another embodiment of the disclosure.

FIG. 6 is a process flow diagram 600 of service provision determination according to another embodiment of the disclosure. The diagram 600 may not comprise the SMS module 310, but may comprise the email validation module 320, the digital services module 330, the fingerprint ID module 340, the proxy type ID module 350, the eSVC service module 360, the decision engine module 370, and the IP Geo module 380. The lined rows may indicate processes performed by their respective modules, and the solid lines may indicate process flow. The process flows are described more fully below with respect to the modules associated with those process flows. Except as otherwise described, the modules may function in a manner similar to that described in FIG. 4.

Returning to FIG. 6, the digital services module 330 may generate the person ID based on data received from another module or device, for instance one of the clients $110_{1-m}$ or one of the application servers $170_{1-n}$. The data received from the other module or device may be an email address, a mobile phone number, both an email address and a mobile phone number, or other suitable data, and the person ID may be the same data, though the data may be reformatted. The digital services module 330 may then create a GUID, which may be an eGift GUID, based on the person ID. The digital services module 330 may then send the GUID to the eSVC service module 360 and instruct the eSVC service module 360 to generate an HTTPS request based on the GUID.

The eSVC service module 360 may generate the HTTPS request and send the request to the email validation module 320, the digital services module 330, the fingerprint ID module 340, the proxy type ID module 350, the decision engine module 370, and the IP Geo lookup module 380. The email validation module 320 may receive the request and generate the EM parameter based on the request. The digital services module 330 may receive the request and generate the Va parameter based on the request. The fingerprint ID module 340 may receive the request and generate the Fp parameter based on the request. The fingerprint ID module 340 may check the negative list stored in the digital services module 330 to determine whether or not the requesting device is blacklisted. The proxy type ID module 350 may receive the request and generate the Px parameter based on the request. The Ip Geo lookup module 380 may receive the request and generate the IP parameter based on the request.

The decision engine module 370 may then receive the EM parameter from the email validation module 320, the Va parameter from the digital services module 330, the Fp parameter from the fingerprint ID module 340, the Px parameter from the proxy type ID module 350, the IP parameter from the IP Geo lookup module 380, and the request from the eSVC service module 360. Based on the EM parameter, Va parameter, Fp parameter, Px parameter, and IP parameter, the decision engine module 370 may then calculate the risk score based on the following equation:

$$\text{risk score} = EM \times Px \times Fp \times Ip \times (Va \times Fp). \quad (2)$$

Each of the parameters may have a default value of 1. The risk score may be segregated into at least one of three value ranges. A first value range, anything greater than or equal to 0.6, may indicate that the risk evaluator 300 may approve the requesting device's service request. Accordingly, the decision engine module 370 may direct the eSVC service module 360 to provide the service to the requesting device. The eSVC service module 360 may then provide the service. If the risk score is less than 0.6, then the decision engine module 370 may determine whether or not the risk score is also greater than 0.3. If the decision engine module 370 determines that the risk score is also greater than 0.3, then a second value range, anything greater than 0.3 but less than 0.6, may indicate that the risk evaluator 300 may or may not approve the requesting device's service request and that secondary validation is required. The secondary validation may be optional and may be any suitable form of validation. Accordingly, the decision engine module 370 may direct the eSVC service module 360 to obtain secondary validation. If the eSVC service module 360 obtains secondary validation, then the eSVC service module 360 may provide the service. If the eSVC service module 360 does not obtain secondary validation, then the eSVC service module 360 may not provide the service. If the decision engine module 370 determines that the risk score is less than or equal to 0.3, then a third value range, anything less than or equal to 0.3, may indicate that the risk evaluator 300 may not approve the requesting device's service request. Accordingly, the decision engine module 370 may direct the eSVC service module 360 to send a failure notification to the requesting device. If the requesting device requested display of an eSVC, then the eSVC service module 360 may send a display failure page to the requesting device.

In addition to the embodiments described in FIGS. 4 and 6, the risk evaluator 300 modules may receive, generate, and send other parameters and other data suitable for evaluating risk. While data is described as being received, generated, or sent at various points in time by various modules, that data may be received, generated, or sent at other points in time by other modules as well. Furthermore, while specific values, a specific algorithm, and a specific equation are described, other values, algorithms, and equations may be suitable for evaluating risk.

Figure 7:
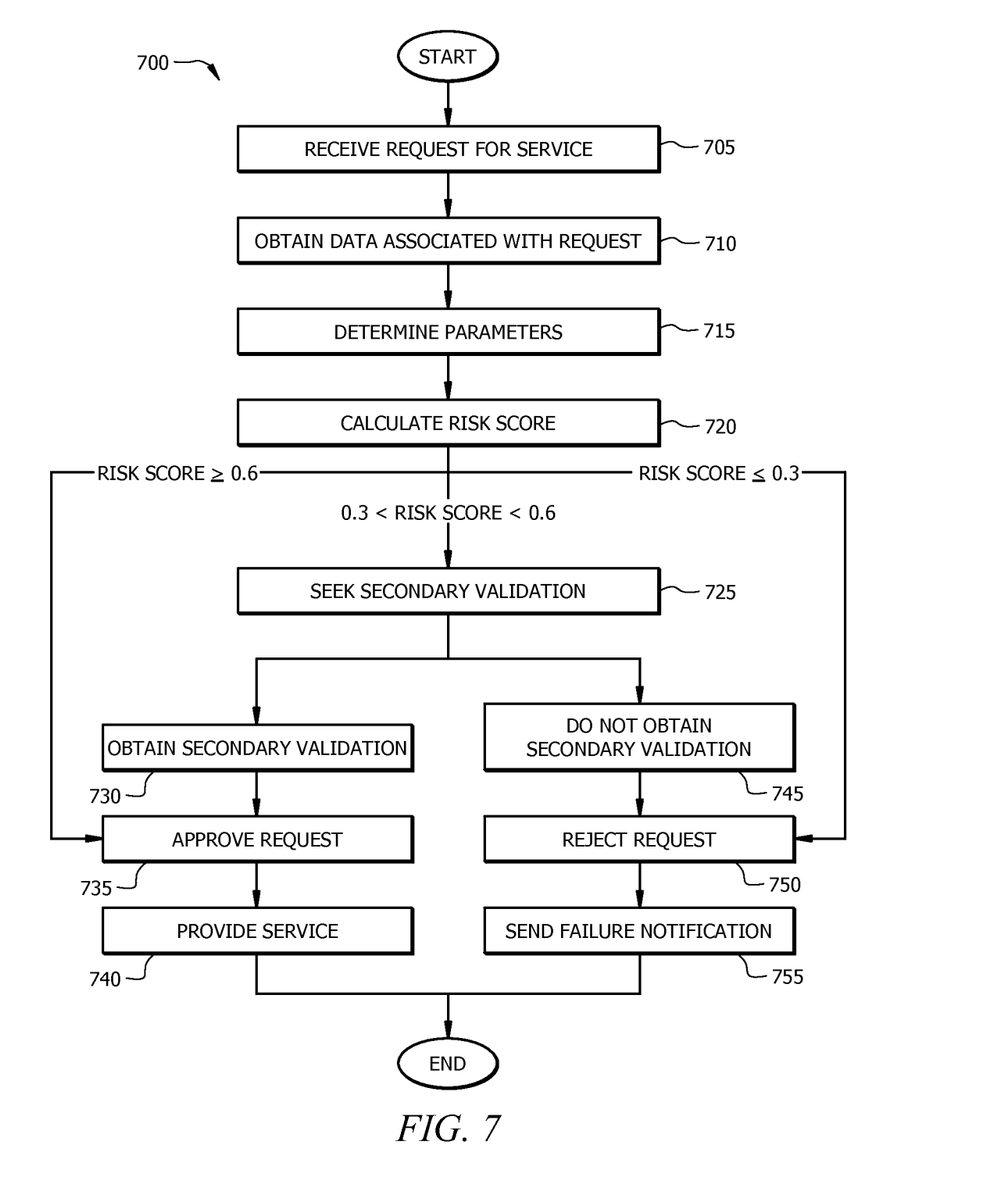
FIG. 7 is a flowchart illustrating a simplified method of service provision determination according to another embodiment of the disclosure.

FIG. 7 is a flowchart illustrating a simplified method 700 of service provision determination according to another embodiment of the disclosure. The method 700 may demonstrate a simplification of the diagram 600 in FIG. 6, so it is understood that additional steps, for instance the steps in FIG. 6, may be necessary to perform the steps shown. Returning to FIG. 7, the risk evaluator 300 may perform the method 700.

At step 705, a request for a service may be received. The request may be received from a requesting device, which may be one of the clients $110_{1-m}$, or the request may be received from a proxy associated with one of the clients $110_{1-m}$. The service may be to view, fund, or authorize an eSVC. At step 710, data associated with the request may be obtained. The data may include an email address, a mobile phone number, both an email address and a mobile phone number, or other suitable data associated with the requesting device or proxy. The data may be included in the request or may be obtained by other means. At step 715, parameters may be determined. The parameters may be the Em parameter, the Va parameter, the Fp parameter, the Px parameter, and the IP parameter. At step 720, a risk score may be calculated. The risk score may be calculated using equation 1.

Depending on the risk score, the method 700 may proceed to one of three paths. If the risk score is greater than or equal to 0.6, then the method may proceed from step 720 to step 735 where the request for the service may be approved. At step 740, the service may be provided. If the risk score is greater than 0.3 but less than 0.6, then the method may proceed to step 725. At step 725, secondary validation may be sought. Secondary validation may be sought and either obtained or not obtained in any suitable manner. If secondary validation is obtained at step 730, then the method 700 may proceed to steps 735 and 740, which are described above. If secondary validation is not obtained at step 745, then the method 700 may proceed to step 750. At step 750, the request for the service may be rejected, and, at step 755, a failure notification may be sent. If the requesting device requested display of an eSVC, then the risk evaluation 300 may send a display failure page to the requesting device. If the risk score is less than or equal to 0.3, then the method 700 may proceed from step 720 to steps 750 and 755, which are described above.

As an example, the client $110_1$ may request, via a proxy, viewing of an eSVC. At step 705, the risk evaluator 300 may receive the request. At step 710, the risk evaluator 300 may obtain data from the request. The data may be an email address associated with the client $110_1$ or a user of the client $110_1$, a phone number associated with the client $110_1$, an IP address of the client $110_1$, and proxy data sufficient to determine whether the proxy is associated with a business or is anonymous. At step 715, the risk evaluator 300 may determine the EM parameter, the Px parameter, the Va parameter, the Fp parameter, and the IP parameter. The EM parameter may be 0.6 because the email address is from a free email provider. For instance, the email address may be john.doe@hotmail.com. The Px parameter may be 0.9 because the proxy server used to initiate the final HTTP request to the webserver is associated with a business. The Fp parameter may be 0.5 because the requesting device is a new device that is unknown to the risk evaluator 300. The IP parameter may be 1 because the requesting device or proxy is in an approved country or region. For instance, the requesting device or proxy may be located in the United States. The Va parameter may be 40 because the GUID was used 40 times to request a service from the risk evaluator 300. At step 720, the risk evaluator 300 may use those parameter values and calculate a risk score of $0.6 \times 0.9 \times 0.5 \times 1 \times (40 \times 0.5) = 5.4$ using equation 2. With a score of 5.4, the decision engine module 370 may proceed to step 735 to approve the request and to step 740 to provide the service.

Figure 8:
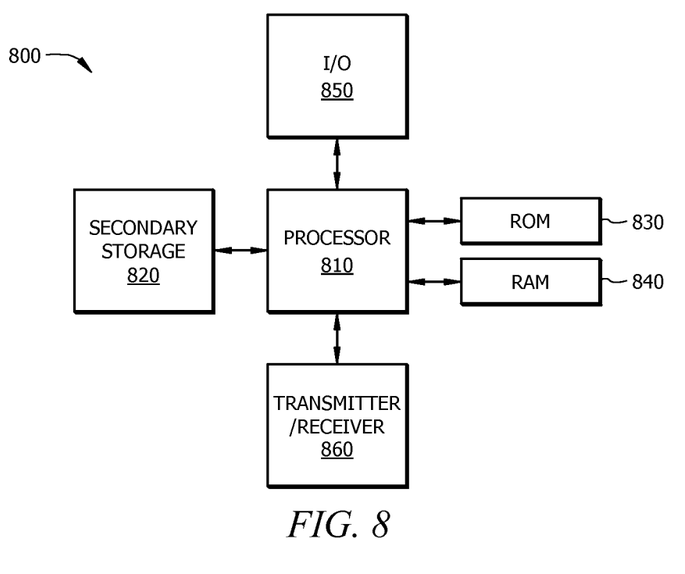
FIG. 8 is a schematic diagram of a computer system according to an embodiment of the disclosure.

FIG. 8 is a schematic diagram of a computer system 800 according to an embodiment of the disclosure. The system 800 may be suitable for implementing the disclosed embodiments, including the clients $110_{1-m}$, the gateway server 140, the eSVC server 150, and the application servers $170_{1-n}$. The system 800 may comprise a processor 810 that is in communication with memory devices, including a secondary storage 820, a read only memory (ROM) 830, a random access memory (RAM) 840, input/output (I/O) devices 850, and a transmitter/receiver 860. Although illustrated as a single processor, the processor 810 is not so limited and may comprise multiple processors. The processor 810 may be implemented as one or more central processor unit (CPU) chips, cores (e.g., a multi-core processor), field-programmable gate arrays (FPGAs), application specific integrated circuits (ASICs), and/or digital signal processors (DSPs), and/or the processor 810 may be part of one or more ASICs. The processor 810 may be implemented using hardware or a combination of hardware and software.

The secondary storage 820 may comprise one or more disk drives or tape drives and may be used for non-volatile storage of data and as an overflow data storage device if the RAM 840 is not large enough to hold all working data. The secondary storage 820 may be used to store programs that are loaded into the RAM 840 when such programs are selected for execution. The ROM 830 may be used to store instructions and data that are read during program execution. The ROM 830 may be a non-volatile memory device that may have a small memory capacity relative to the larger memory capacity of the secondary storage 820. The RAM 840 may be used to store volatile data and perhaps to store instructions. Access to both the ROM 830 and the RAM 840 may be faster than to the secondary storage 820.

The transmitter/receiver 860 may serve as an output and/or input device of the system 800. For example, if the transmitter/receiver 860 is acting as a transmitter, it may transmit data out of the system 800. If the transmitter/receiver 860 is acting as a receiver, it may receive data into the system 800. The transmitter/receiver 860 may take the form of modems; modem banks; Ethernet cards; universal serial bus (USB) interface cards; serial interfaces; token ring cards; fiber distributed data interface (FDDI) cards; wireless local area network (WLAN) cards; radio transceiver cards such as code division multiple access (CDMA), global system for mobile communications (GSM), long-term evolution (LTE), worldwide interoperability for microwave access (WiMAX), and/or other air interface protocol radio transceiver cards; and other well-known network devices. The transmitter/receiver 860 may enable the processor 810 to communicate with the Internet or one or more intranets. The I/O devices 850 may comprise a video monitor, a liquid crystal display (LCD), a touch screen display, or another type of video display for displaying video and may also include a video recording device for capturing video. The I/O devices 850 may also include one or more keyboards, mice, track balls, or other well-known input devices.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. There has been described herein systems and methods for providing a security code of an electronic stored-value card such that users may purchase, redeem, and/or exchange value associated with the electronic stored-value card (e.g., electronic value tokens residing in an electronic wallet). It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

What is claimed is:
1. An apparatus comprising:
   a receiver configured to receive a request for an electronic stored-value card service;
   a processor coupled to the receiver and configured to execute a program to cause the processor to:
      first, obtain data associated with the request,
      second, process the data, third, determine parameters based on the data, wherein the parameters comprise (1) an email type parameter, wherein the email type parameter comprises a determination that an email address leverages a free email provider, (2) a view attempt parameter, wherein the view attempt parameter comprises information concerning use of a graphical user interface, (3) a device fingerprint parameter, wherein the device fingerprint parameter identifies a unique device, (4) a proxy type parameter, wherein the proxy type parameter comprises information for initiating a final http request, and (5) an IP parameter, wherein the IP parameter comprises information identifying a device location, fourth, calculate a risk score via solving an equation comprising the parameters, wherein the equation is, risk score=EM×Px×Fp×Ip×(Va×Fp), where EM is the email type parameter, Px is the proxy type parameter, Va(Fp) is the view attempt parameter, Fp is the device fingerpoint parameter, and Ip is the IP parameter, and fifth, perform an electronic stored-value card transaction risk evaluation based on the risk score;

a plurality of memory devices, wherein access to a first memory device is faster than access to a second memory device and wherein a program is transferred from the second memory device to the first memory device for execution; and a transmitter coupled to the processor and configured to transmit a response to the request, wherein the response is based on the risk evaluation.

2. The apparatus of claim 1, wherein the apparatus is an electronic stored-value card (eSVC) server.

3. The apparatus of claim 1, wherein the data are at least one of:
an email address;
a phone number; and
an Internet Protocol (IP) address.

4. The apparatus of claim 1, wherein the email type parameter indicates that the email address is at least one of:
trusted;
from a free email provider; and
high risk.

5. The apparatus of claim 1, wherein the view attempt parameter indicates a number of times an entity or an identifier associated with the entity has been used to request the service or another service from the apparatus.

6. The apparatus of claim 1, wherein the device fingerprint parameter:
uniquely identifies an entity associated with the request;
is determined based on a proprietary method; and
indicates at least one of:
the entity is blacklisted,
the entity is known to the apparatus, and
the entity is not known to the apparatus.

7. The apparatus of claim 1, wherein the proxy type parameter indicates that a proxy server used to initiate the request is at least one of:
anonymous; and
associate with a valid business.

8. The apparatus of claim 1, wherein the IP parameter indicates that a country or region associated with an entity associated with the request is at least one of:
approved; and
not approved.

9. An apparatus comprising:
a plurality of memory devices, wherein access to a first memory device is faster than access to a second memory device and wherein a program is transferred from the second memory device to the first memory device for execution;

a processor configured to execute the program to cause (a) first modules to determine parameters based on an electronic stored-value card request, wherein the parameters comprise (1) an email type parameter, wherein the email type parameter comprises a determination that an email address leverages a free email provider, (2) a view attempt parameter, wherein the view attempt parameter comprises information concerning use of a graphical user interface, (3) a device fingerprint parameter, wherein the device fingerprint parameter identifies a unique device, (4) a proxy type parameter, wherein the proxy type parameter comprises information for initiating a final http request, and (5) an IP parameter, wherein the IP parameter comprises information identifying a device location and (b) a second module coupled to the first modules to first, receive the parameters from the first modules, second, calculate a risk score via solving an equation comprising those parameters, wherein the equation is, risk score=EM×Px×Fp×Ip×(Va×Fp), where EM is the email type parameter, Px is the proxy type parameter, Va(Fp) is the view attempt parameter, Fp is the device fingerprint parameter, and Ip is the IP parameter; and third, determine whether or not to provide an electronic stored-value card (eSVC) service based on the risk score.

10. The apparatus of claim 9, wherein the modules comprise an email validation module configured to determine the email type parameter, a digital services module configured to determine the view attempt parameter, a fingerprint identification (ID) module configured to determine the device fingerprint parameter, a proxy type ID module configured to determine the proxy type parameter, and an IP geographical (Geo) module configured to determine the IP parameter.

11. The apparatus of claim 9, wherein the service is at least one of:
displaying an eSVC;
funding the eSVC; and
authorizing the eSVC.

12. A method comprising:
receiving a request for an electronic financial service;
transferring a program for responding to the request from a first memory device to a second memory device, wherein access to the second memory device is faster than access to the first memory device;
executing the program by a processor, which causes the processor to (a) obtain data associated with the request, (b) determine parameters based on the data, wherein the parameters comprise (1) an email type parameter, wherein the email type parameter comprises a determination that an email address leverages a free email provider, (2) a view attempt parameter, wherein the view attempt parameter comprises information concerning use of a graphical user interface, (3) a device fingerprint parameter, wherein the device fingerprint parameter identifies a unique device, (4) a proxy type parameter, wherein the proxy type parameter comprises information for initiating a final http request , and (5) an IP parameter, wherein the IP parameter comprises information identifying a device location, and (c) calculating a risk score via solving an equation comprising the parameters, wherein the equation is, risk score=EM×Px×Fp×Ip×(Va×Fp), where EM is the email type parameter, Px is the proxy type parameter, Va(Fp) is the view attempt parameter, Fp is the device fingerprint parameter, and Ip is the IP parameter; and sending a response to the request based on the risk score.

13. The method of claim 12, wherein the response approves the request, rejects the request, or is based on secondary validation.

14. The method of claim 13, further comprising:
providing the service when the secondary validation is obtained; or
withholding the service when the secondary validation is not obtained.

15. The method of claim 14, wherein the data is at least one of an email address, a phone number, and an Internet Protocol (IP) address, wherein the service is at least one of displaying an eSVC, funding the eSVC, and authorizing the eSVC, and wherein the risk score indicates a risk of at least one of fraud, theft, and unauthorized access.

16. A system comprising:
a plurality of memory devices, wherein access to a first memory device is faster than access to a second memory device and wherein a program is transferred from the second memory device to the first memory device for execution;
a processor configured to execute the program to cause (a) at least one first module configured to determine parameters based on a request, wherein the parameters comprise (1) an email type parameter, wherein the email type parameter comprises a determination that an email address leverages a free email provider, (2) a view attempt parameter, wherein the view attempt parameter comprises information concerning use of a graphical user interface, (3) a device fingerprint parameter, wherein the device fingerprint parameter identifies a unique device, (4) a proxy type parameter, wherein the proxy type parameter comprises information for initiating a final http request, and (5) an IP parameter, wherein the IP parameter comprises information identifying a device location, (b) a second module coupled to at least one first module to receive the parameters from the first module, calculate a risk score via solving an equation comprising those parameters, wherein the equation is, risk score=EM×Px×Fp×Ip×(Va×Fp), where EM is the email type parameter, Px is the proxy type parameter, Va(Fp) is the view attempt parameter, Fp is the device fingerprint parameter, and Ip is the IP parameter, and (c) determine whether or not to provide an electronic financial service based on the risk score.

* * * * *